United States Patent [19]
Johnson

[11] 3,786,928
[45] Jan. 22, 1974

[54] BICYCLE RACK

[76] Inventor: J. Robert Johnson, 13090 Alta Ln. North, Los Altos Hills, Calif. 94022

[22] Filed: Apr. 17, 1972

[21] Appl. No.: 244,476

[52] U.S. Cl................................ 211/5, 211/22
[51] Int. Cl............................................ E05b 73/00
[58] Field of Search....... 211/5, 4, 8, 17, 20, 22, 19, 211/18, 7, 64; 70/234, 235, 233

[56] References Cited
UNITED STATES PATENTS
640,736    1/1900    Biester ............................ 211/18 X FOREIGN PATENTS OR APPLICATIONS
183,979    4/1918    Canada ............................... 70/234
614,789    2/1961    Canada .................................. 211/7
851,826    10/1939   France .................................. 211/5
4,575      2/1897    Great Britain ...................... 211/17

Primary Examiner—Ramon S. Britts

[57] ABSTRACT

The bicycle rack of this invention provides a supporting structure having a longitudinal member or rail against which a bicycle may be leaned, two transverse members which may extend through (1) the front wheel of the bicycle and (2) both the rear wheel and the frame of the bicycle. A locking member closes between both of the transverse members to secure the bicycle between the longitudinal member and the locking member. A rear transverse member connects with the longitudinal member and other longitudinal members of adjacent bicycle racks forming a continuous bank of similar bicycle racks, and further provides a slidable and pivotal mounting for said locking member. These members provide a framework structure wherein a bicycle may be parked and secured against theft or unauthorized removal.

5 Claims, 4 Drawing Figures

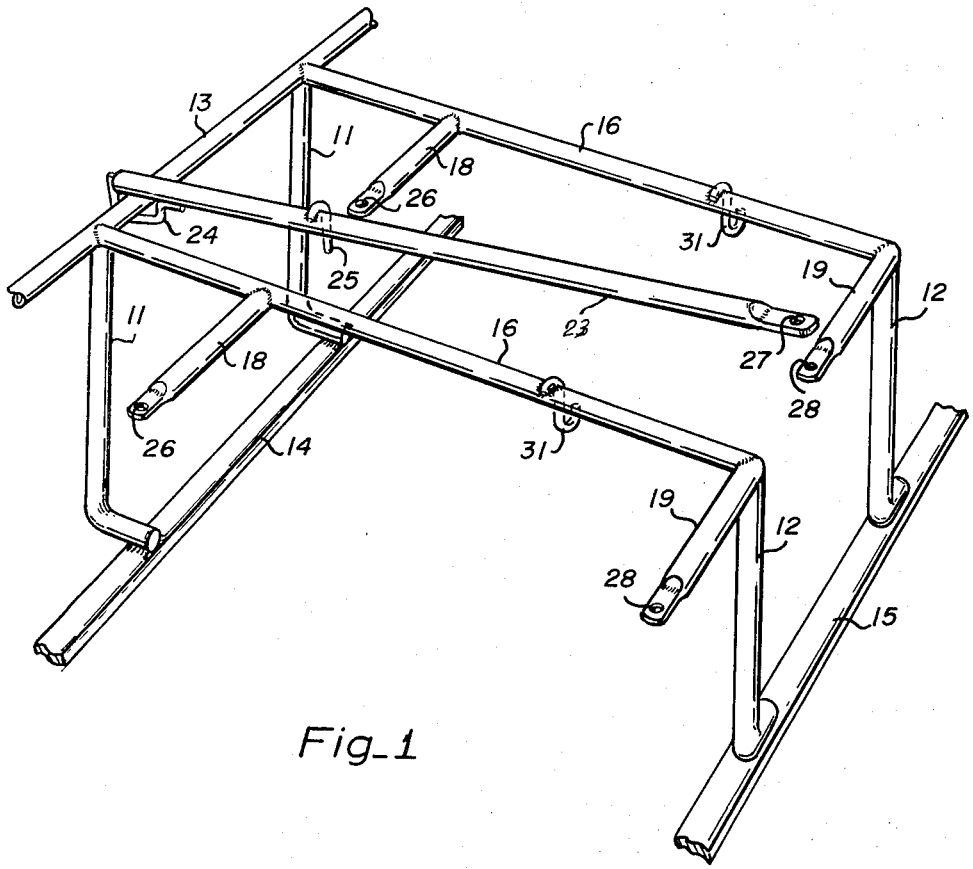
Fig_1
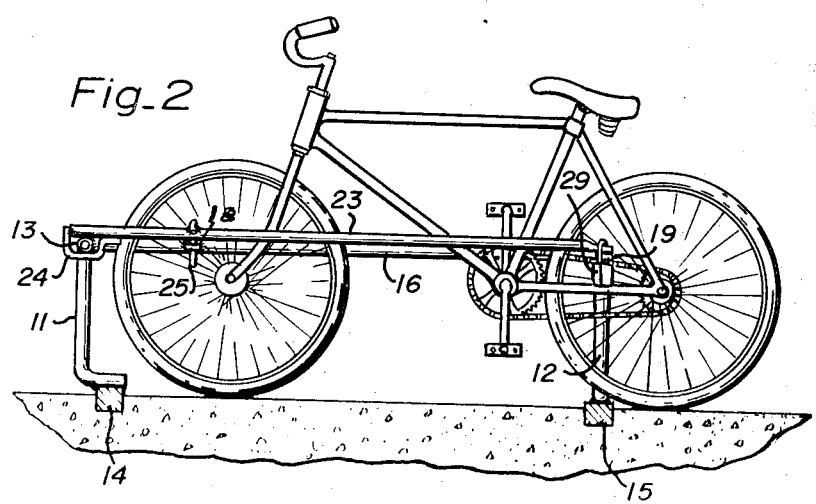
Fig_2

PATENTED JAN 22 1974
3,786,928
SHEET 2 OF 2
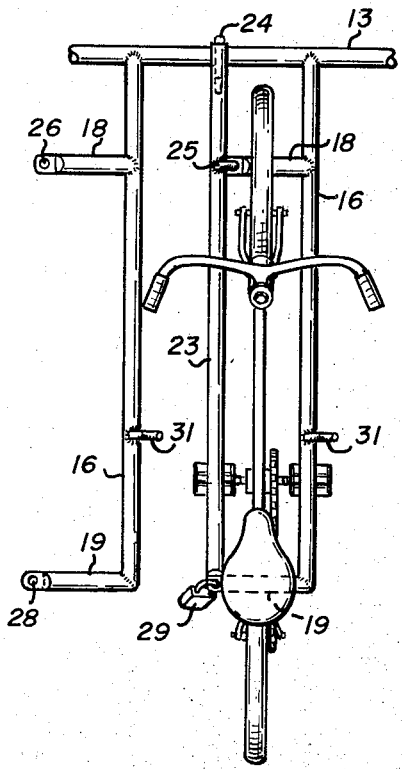
Fig_3
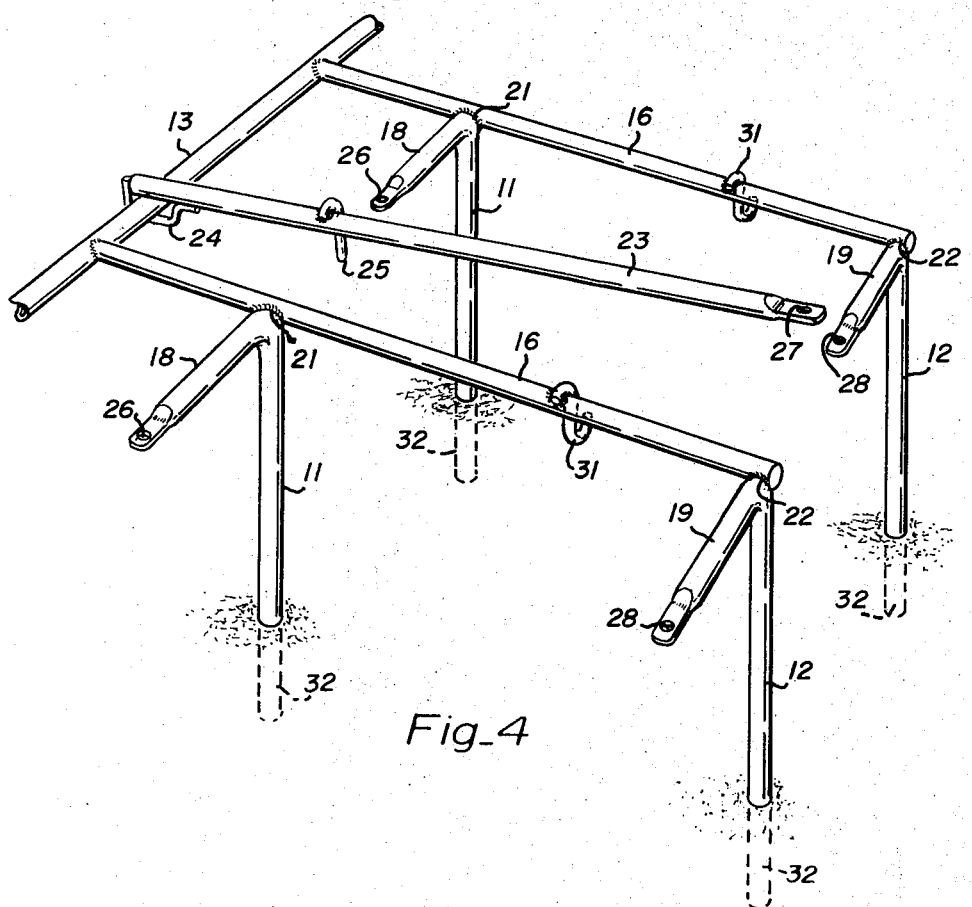
Fig_4

BICYCLE RACK

BACKGROUND OF THE INVENTION

This invention relates to bicycle racks; and more particularly, this invention relates to a locking rack for securing a bicycle against theft or unauthorized removal while providing easy accessibility of the bicycle to its owner who may quickly and easily place the bicycle in the rack and lock the rack with the bicycle therein, and similar may quickly and easily remove the bicycle from the rack.

It is an object of this invention to provide an improved locking bicycle rack for security and holding both wheels and the frame of the bicycle, and for providing a locking arrangement whereby the whole assembly wheels may be secured by a single padlock supplied by the bicycle owner. the other It is a further object to provide an improved locking type bicycle rack wherein the bicycle may be leaned against a longitudinal member or rail with transverse members or studs protruding through the front and rear wheels and frame of the bicycle, and wherein a single elongated locking member extends between and locks with the transverse members to enclose the bicycle between the longitudinal member on one side and the locking member on the other side.

DESCRIPTION OF THE DRAWINGS

The various features and advantages of this bicycle rack will be appreciated from the following description taken in connection with the drawings. The figures of the drawings are as follows:

FIG. 1 is a perspective view illustrating the bicycle rack of this invention;

FIG. 2 is a vertical or elevation view of the rack with a bicycle therein;

FIG. 3 is a top or plan view of the rack with the bicycle therein; and

FIG. 4 is a perspective view similar to FIG. 1 but illustrating a second embodiment of this invention.

DESCRIPTION OF THE PREFERRED EMBODIMENTS

For purposes of this patent certain structural members are said to extend "transversely" or "longitudinally", and these terms are related to the position of a bicycle which may be placed within the rack. Transverse members extend transversely past or through the bicycle; and longitudinal members extend longitudinally beside the bicycle. One end of the bicycle rack is open for access, and the other end, being closed and rather inaccessible, will be designated as the "rear" of the rack.

As shown in FIG. 1, a supporting structure includes a first or rearward vertical member 11, and a second or foreward vertical member 12. FIG. 1 shows one complete bicycle rack and parts of further adjacent racks such that some of the structure is duplicated. A rear transverse member 13 is attached to the vertical member 11 of the specific bicycle rack being described, and also extends and attaches to the vertical members 11 of similar adjacent members which together form a bank of bicycle racks. Transverse members 14 and 15 connect respectively to the lower ends of the first and second vertical members 11 and 12. These transverse members 14 and 15 lie at ground level or just beneath ground level providing no hazard or impediment to persons and bicycles which may move thereover. A longitudinal member 16 connects to both the rear transverse member 13 and the first vertical member 11 at the rear end, and extends to and connects with the second vertical member 12 at the front end of the bicycle rack. The longitudinal member provides a convenient rail against which a bicycle may be leaned.

Two transverse members or studs 18 and 19 are attached and held by the supporting structure described above. In FIG. 1, the transverse members 18 and 19 are welded or otherwise attached to the longitudinal member 16 of the supporting structure. In the embodiment of FIG. 4, the vertical members 11 and 12 are terminated in bends 21 and 22, and then extend transversely as the transverse members 18 and 19. Therefore, in the embodiment of FIG. 4, the vertical members 11 and 12 are formed integrally with the transverse members 18 and 19. As shown in FIGS. 2 and 3, the first transverse member 18 will extend through the front wheel of a bicycle; and the second transverse member 19 will extend through the rear wheel and the frame parts of the bicycle. With the bicycle in place an elongated locking member 23 will lock to both transverse members 18 and 19 as will be described below.

The elongated locking member 23 has a rearward termination in an eye or hole 24 which encircles the rear transverse member 13. As best shown in FIGS. 1 and 4, the eye may be formed by bending the end of the locking member 23 into a loop that closes upon itself. A downwardly extending stud 25 is welded or otherwise attached to the elongated locking member 23. This stud is positioned and dimensioned to drop or extend downwardly through a mating hole or eye 26 in the first transverse member 18. A hole 27 is formed in the forward end of the locking member 23; and a corresponding hole 28 in the end of the second transverse member 19. The holes 27 and 28 are positioned and dimensioned to lie together and to receive the shackle loop of a padlock 29 (shown in FIGS. 2 and 3).

A bicycle is locked in the rack of this invention by first leaning the bicycle against the longitudinal member 16 with the first transverse member 18 extending through the front wheel, and the second transverse member extending through the rear wheel and the bicycle frame. Secondly, the elongated locking member 23 is pivoted upwardly and slidably moved along the rear transverse member 13 until the stud 25 can be brought downwardly and inserted into the hole 26 of the transverse member 18, and the hole 27 is positioned to overlie the hole 28 of the second transverse member 19. Finally, the shackle loop of the padlock is inserted through the two holes 28 and 29, and the padlock is closed. The bicycle is now secured between the longitudinal member 16 and the locking member 23 with the transverse members 18 and 19 extending through the wheels and the frame of the bicycle. To remove the bicycle, the above steps are reversed. The locking member 23 may be moved away from the bicycle and placed upon a convenient hook or holder 31 which is attached to the longitudinal member 16 of the next adjacent stall or rack in the bank of bicycle racks. With the locking member 23 clear, the rack is accessible from the front and the owner may step into the stall or rack to retrieve and remove the bicycle.

The embodiment of FIG. 4 provides vertical members 11 and 12 which can be set into the ground and can extend downwardly as posts 32 to support the whole structure. The posts 32 can be set in concrete or any other convention method.

To make the bicycle rack of this invention as theft-proof as possible, certain of the parts should be of very hard and durable material such as case hardened steel, and other parts must be massive and difficult to cut or break with ordinary tools. In the embodiment of FIG. 1, it is contemplated that the longitudinal member 16, and the rear transverse member 13 be fabricated of 1 ½ inch diameter steel pipe. The transverse members 18 and 19 shall be of case hardened steel, and the locking member 23 with its stud 25 shall be of case hardened steel. Obviously, this is a matter of choice and other materials can be used.

The embodiment of FIG. 4 is somewhat more advantageous, in that the parts needed to be made massive or of case hardened steel are of lesser in size. In this case, the vertical members 11 and 12 with the integrally formed transverse members 18 and 19 need be of hardened and durable material. The longitudinal member 16 need not be of special material since the bicycle merely rests against this member. If the member 16 were removed, the bicycle would remain locked with wheels and frame about the vertical members 11 and 12 (although the bicycle might be lying on the ground). The rear transverse member 13 and the locking member 16 both should be massive or hardened as in the prior embodiment.

It will be appreciated that the bicycle rack of this invention provides improved security features for locking bicycles in as theft-proof a manner as possible in today's technology. While secure, the bicycle rack is nevertheless easily accessible to bicycle owner's who use their own padlocks in the final locking process.

This invention is claimed as follows:

1. A rack for securing both wheels and frame of a bicycle, said rack comprising:
   a supporting structure
   two spaced apart transverse members attached to said supporting structure, a first of the members being adapted to extend through a first of said bicycle wheels, and the second member being adapted to extend through the second bicycle wheel and through the frame of said bicycle; and an elongated locking member adapted to be secured to the ends of both transverse members whereby said bicycle is held between the supporting structure and the elongated locking member, said supporting structure comprising a first vertical member from ground level and a second vertical member from ground level, and a longitudinal bicycle supporting member attached to both said vertical members to provide a convenient rail against which a bicycle may be leaned, said two spaced apart transverse members being attached to said longitudinal bicycle supporting member whereby said bicycle is held between said longitudinal supporting member and said elongated locking member, and said supporting structure further comprising a rear transverse member connecting to said longitudinal bicycle supporting member of said rack and further extending to other longitudinal bicycle supporting members of other racks which forms a continuous bank of similar racks for a plurality of bicycles, said elongated locking member being slidably and pivotally supported on said transverse member.

2. A rack for securing a bicycle in accordance with claim 1 wherein said elongated locking member includes an eye at a rear end thereof for encircling said rear transverse member.

3. A rack for securing a bicycle in accordance with claim 2 wherein said first transverse member terminates in an eye and wherein said elongated locking member includes a downwardly extending stud adapted to drop downwardly and lock into the eye of said first transverse member; and wherein said second transverse member terminates in an eye and wherein said elongated locking member includes a mating eye whereby a padlock shackle will extend through both the eye of said second transverse member and the eye of said elongated locking member to lock said members together.

4. A rack for securing a bicycle in accordance with claim 1 wherein said first vertical member is terminated in a bend and is integral with said first transverse member extending horizontally from said bend, and wherein said second vertical member is similarly terminated in a bend and is integral with said second transverse member extending horizontally from said bend, said longitudinal bicycle supporting member being attached to both vertical numbers near said bends therein.

5. A rack for securing a bicycle in accordance with claim 1 wherein said first vertical member connects with and supports said rear transverse member, and wherein said longitudinal bicycle supporting member connects between and is supported by both said rear transverse member and said second vertical member.

* * * * *